(12) United States Patent
Hafenrichter et al.

(10) Patent No.: US 11,319,070 B2
(45) Date of Patent: May 3, 2022

(54) DEPLOYABLE CLASPING SYSTEMS AND METHODS

(71) Applicant: THE BOEING COMPANY, Chicago, IL (US)

(72) Inventors: Joseph L. Hafenrichter, Seattle, WA (US); Gary E. Georgeson, Tacoma, WA (US)

(73) Assignee: THE BOEING COMPANY, Chicago, IL (US)

( * ) Notice: Subject to any disclaimer, the term of this patent is extended or adjusted under 35 U.S.C. 154(b) by 285 days.

(21) Appl. No.: 16/455,854

(22) Filed: Jun. 28, 2019

(65) Prior Publication Data
US 2020/0407061 A1  Dec. 31, 2020

(51) Int. Cl.
| | | |
|---|---|---|
| *B64D 1/22* | (2006.01) | |
| *B64C 39/02* | (2006.01) | |
| *B66C 1/28* | (2006.01) | |
| *B66C 1/66* | (2006.01) | |
| *F16L 37/127* | (2006.01) | |

(52) U.S. Cl.
CPC .............. *B64D 1/22* (2013.01); *B64C 39/024* (2013.01); *B66C 1/28* (2013.01); *B66C 1/66* (2013.01); *B64C 2201/128* (2013.01); *F16L 37/127* (2013.01)

(58) Field of Classification Search
CPC ........... B64D 1/22; B64C 39/024; B66C 1/28; B66C 1/66
USPC .................................................. 294/2, 82.33
See application file for complete search history.

(56) References Cited

U.S. PATENT DOCUMENTS

| 5,125,601 A * | 6/1992 | Monford, Jr. .......... B64G 1/641 244/173.1 |
| 9,016,634 B1 * | 4/2015 | Ratner ...................... B64B 1/40 244/137.4 |
| 10,249,200 B1 * | 4/2019 | Grenier ................ G05D 1/0088 |
| 10,914,332 B1 * | 2/2021 | Jacquemin .............. B63B 21/50 |
| 2015/0158587 A1 * | 6/2015 | Patrick ..................... B64D 1/12 244/137.4 |
| 2018/0072418 A1 * | 3/2018 | Shannon .................. B64D 1/22 |
| 2018/0072420 A1 * | 3/2018 | Prager .................. B64D 17/383 |

(Continued)

FOREIGN PATENT DOCUMENTS

| EP | 3228577 | 10/2017 |
| JP | H10305989 | 11/1998 |

(Continued)

OTHER PUBLICATIONS

Extended European Search Report for EP 20175479.3-1010, dated Nov. 16, 2020.

(Continued)

*Primary Examiner* — Paul T Chin
(74) *Attorney, Agent, or Firm* — The Small Patent Law Group LLC; Joseph M. Butscher

(57) ABSTRACT

A deployable clasping system is configured to be deployed from a component and securely clasp and release an object. The deployable clasping system includes a cable that is deployable from the transit vehicle. A clasp assembly is coupled to the cable. The clasp assembly is configured to securely clasp the object. A propulsion sub-system is coupled to one or both of the cable and the clasp assembly. The propulsion sub-system is configured to maneuver the clasp assembly to the object.

21 Claims, 9 Drawing Sheets

(56) References Cited

U.S. PATENT DOCUMENTS

| | | | |
|---|---|---|---|
| 2018/0072421 A1* | 3/2018 | Prager | B64D 1/22 |
| 2018/0099748 A1* | 4/2018 | Lesperance | B64D 1/22 |
| 2018/0354625 A1 | 12/2018 | Verkade | |
| 2019/0010031 A1* | 1/2019 | Humble | B66D 1/505 |
| 2019/0061944 A1* | 2/2019 | Zvara | B64D 1/22 |
| 2019/0072953 A1 | 3/2019 | Maheshwari | |
| 2019/0100314 A1* | 4/2019 | Prager | B66D 1/485 |
| 2019/0135437 A1* | 5/2019 | Halevy | B66C 1/34 |
| 2019/0152600 A1 | 5/2019 | Kuk | |
| 2019/0193856 A1* | 6/2019 | Prager | B66C 1/425 |
| 2020/0172244 A1* | 6/2020 | Green | G06Q 10/083 |
| 2020/0207474 A1* | 7/2020 | Foggia | G05D 1/0676 |
| 2020/0337324 A1* | 10/2020 | Foster | A23J 1/148 |

FOREIGN PATENT DOCUMENTS

| | | |
|---|---|---|
| JP | 2014091413 | 5/2014 |
| WO | WO 2018/234670 | 12/2018 |

OTHER PUBLICATIONS

U.S. Appl. No. 16/202,347, filed Nov. 28, 2018.
U.S. Appl. No. 16/216,096, filed Dec. 11, 2018.

* cited by examiner

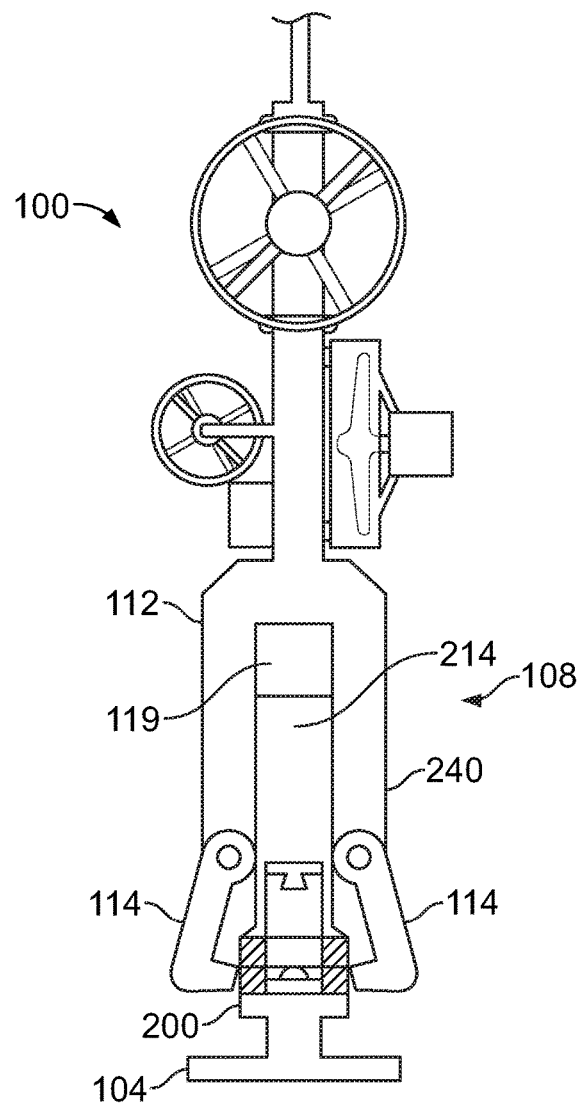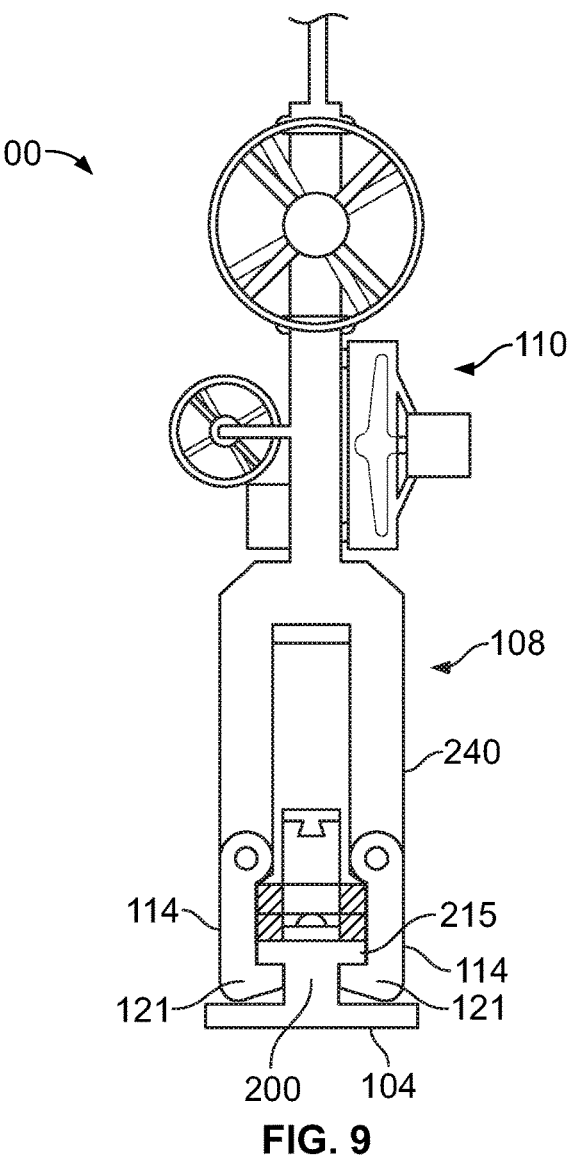

DEPLOYABLE CLASPING SYSTEMS AND METHODS

FIELD OF EMBODIMENTS OF THE DISCLOSURE

Embodiments of the present disclosure generally relate to deployable clasping systems and methods that are used to securely clasp and release an object, and more particularly to deployable clasping systems and methods for cranes and aircraft, for example.

BACKGROUND OF THE DISCLOSURE

Various recovery systems include a cable having a hook that is used to grasp onto an object. The cable and hook are typically maneuvered by a recovery operator into a position where the hook is secured to the object. The recovery operator manipulates the hook to secure the hook to the object. Once the hook is secured to the object, the cable may be hoisted upwardly to lift and move the object. Notably, the task of maneuvering the hook and latching onto the object may require substantial training and skill.

In tactical situations, a soldier may need to be recovered from a particular position. For example, the soldier may be wounded or stranded on a field of battle or behind enemy lines. However, the soldier may not be able to grasp a recovery hook or other such structure, such as deployed from a helicopter, in order to be airlifted from the field. Accordingly, a recovery crew may be sent to the location of the wounded soldier and deployed thereto in order to airlift the soldier to safety.

As can be appreciated, the recovery crew may be at risk at the location, such as if hostile adversaries are present. In general, a recovery crew may be endangered on various recovery missions. In certain instances, the recovery mission may be delayed if a danger to the recovery crew is determined to be excessive. Moreover, recovery hooks deployed from helicopters may be susceptible to getting stuck in jungle canopies, canyon crevices, urban alleyways, and the like.

SUMMARY OF THE DISCLOSURE

A need exists for an efficient, reliable, and automatically operated clasping system and method. Further, a need exists for a clasping system and method that allow an object to be safely recovered. Moreover, a need exists for a clasping system and method that allow for safe deployment to a location.

With those needs in mind, certain embodiments of the present disclosure provide a deployable clasping system that is configured to be deployed from a component, such as a transit vehicle to securely clasp and release an object. The deployable clasping system may be used to insert the object into a location and/or recover the object from the location. The deployable clasping system includes a cable that is deployable from the transit vehicle. In at least one embodiment, a winch deploys the cable. A clasp assembly is coupled to (for example, mounted on or otherwise to) the cable. The clasp assembly is configured to securely clasp the object. A propulsion sub-system is coupled to one or both of the cable or the clasp assembly. The propulsion sub-system is configured to maneuver the clasp assembly to the object. In at least one embodiment, the winch and the propulsion sub-system are used to maneuver the clasp assembly to the object.

In at least one embodiment, the clasp assembly includes one or more couplers operatively coupled to (for example, mounted on or otherwise to) a clasp chassis.

In at least one embodiment, the propulsion system includes one or more propellers. In at least one other embodiment, the propulsion sub-system includes a vessel of compressed gas, pressurized liquid, or rocket thrusters.

In at least one embodiment, a guidance device is configured to guide movement (of the clasp assembly to the object. For example, the guidance device includes one or more sensors, which may be mounted to a clasp core. A magnetic hitch is positioned on a distal end of the clasp core. The magnetic hitch is configured to magnetically couple to a magnetic portion of a target structure coupled to the object. One or more couplers securely latch onto the target structure after the magnetic hitch magnetically couples to the magnetic portion of the target structure.

In at least one embodiment, a guidance control unit is in communication with the guidance device. The clasp control unit may include the guidance control unit. That is, the guidance control unit may be part of the clasp control unit. Alternatively, the clasp control unit and the guidance control unit may be separate and distinct control units. The guidance control unit receives guidance signals output by the guidance device (such signals may be reflected by the object and received by one or more sensors) to guide movement of the clasp assembly to the object.

In at least one embodiment, a clasp control unit is in communication with the propulsion sub-system and the clasp assembly. The clasp control unit controls operation of the propulsion sub-system and the clasp assembly.

In at least one embodiment, the transit vehicle is a crane. In at least one other embodiment, the transit vehicle is an aircraft. As an example, the aircraft is an unmanned aerial vehicle.

Certain embodiments of the present disclosure provide a deployable clasping method that is configured to securely clasp and release an object. The deployable clasping method includes coupling a clasp assembly that is configured to securely clasp the object to a cable, deploying the cable from a component, such as a transit vehicle, and maneuvering the clasp assembly to the object by a propulsion sub-system that is coupled to one or both of the cable or the clasp assembly.

The coupling the clasp assembly step may include operatively coupling one or more couplers to a clasp chassis. The maneuvering may include maneuvering the clasp assembly to the object by at least one propulsion device, such as one or more propellers, ducted fans, thrusters, or the like.

The deployable clasping method may also include guiding movement of the clasp assembly to the object by a guidance device. The deployable clasping method may also include magnetically coupling the clasp assembly to a target structure coupled to the object. The deployable clasping method may also include securely latching onto the target structure after the magnetically coupling. In at least one embodiment, the deployable clasping method includes controlling the clasp assembly and the propulsion sub-system by a clasp control unit.

Certain embodiments of the present disclosure provide an unmanned aerial vehicle (UAV) including an airframe, and a deployable clasping system secured to the airframe. The deployable clasping system is configured to be deployed from the airframe and securely clasp and release an object.

BRIEF DESCRIPTION OF THE DRAWINGS

FIG. 8 illustrates a front view of the deployable clasping system moving onto the target structure of the object.

FIG. 9 illustrates a front view of the deployable clasping system securely clasping the target structure of the object.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a deployable clasping system that is used with a transit vehicle, such as an aircraft (for example, a helicopter, and unmanned aerial vehicle (UAV), a crane, or the like). The deployable clasping system is configured to grasp and lift an object to be recovered and/or be inserted into a location. The object may be an individual (such as a wounded soldier or civilian or animal in need of rescue), or various non-living objects, such as a beam to be positioned during a construction, an improvised explosive device, or the like. The deployable clasping system includes a cable that is configured to be selectively deployed from the transit vehicle. A propulsion sub-system is used to maneuver a clasp assembly to the object. The clasp assembly includes one or more couplers that are configured to securely couple to the object. A clasp control unit controls operation of the propulsion sub-system and the clasp assembly. In at least one embodiment, a clasp control unit and/or a guidance control unit is used to automatically maneuver the clasp assembly, via the propulsion sub-system, to the object. For example, the guidance control unit may be used to control guidance to the object.

In at least one embodiment, a controller of a transit vehicle controls the transit vehicle into a vicinity of an object. Subsequently, the clasp control unit controls a winch to vertically maneuver a clasp assembly, and also a propulsion sub-system to horizontally maneuver the clasp assembly, in order to clasp onto the object, and/or a target structure on the object.

Figure 1:
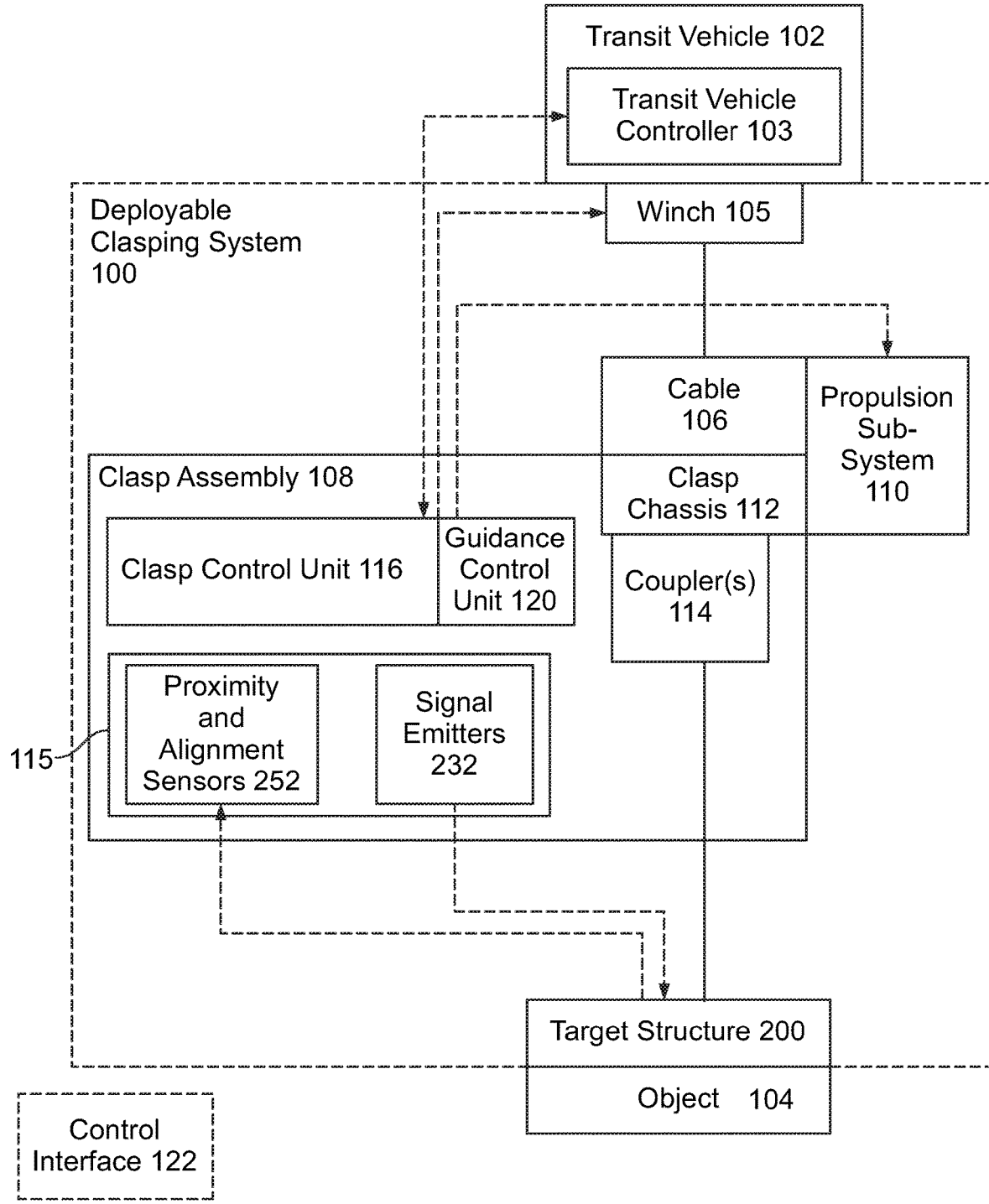
FIG. 1 illustrates a schematic block diagram of a deployable clasping system of a transit vehicle that is used to securely clasp and release an object, according to an embodiment of the present disclosure.

FIG. 1 illustrates a schematic block diagram of a deployable clasping system 100 of a transit vehicle 102 that is used to securely clasp and release an object 104, according to an embodiment of the present disclosure. The transit vehicle 102 may be a crane, an aircraft (such as a helicopter, or a UAV), or the like. The object 104 may be a non-living, inanimate object, such as a construction material (for example, a beam, block, frame, wall, or the like), a vehicle, a box of material(s), or various other items to be lifted and extracted from a location. As another example, the object 104 may be an individual, such as a wounded solder or civilian in need of rescue.

The transit vehicle 102 is an example of a component from which the deployable clasping system 100 is deployed. The component 102 may be a vehicle, or optionally may be fixed to a structure, such as a crane mounted to a building (such as used for construction).

The deployable clasping system 100 includes a cable 106 that is configured to be deployed from a portion of the transit vehicle 102. The transit vehicle 102 includes one or more transit vehicle controller(s) 103 that controls operation of the transit vehicle 102. The transit vehicle 102 may also include a winch 105 on which the cable 106 is spooled, and which is used to selectively spool and unspool the cable 106. The winch 105 may be controlled by the transit vehicle controller(s) 103. A clasp assembly 108 is coupled to (for example, mounted to) the cable 106. For example, the clasp assembly 108 is secured to a distal end of the cable 106. A propulsion sub-system 110 is coupled to (for example, mounted on or otherwise to) the clasp assembly 108 and/or the cable 106. For example, the propulsion sub-system 110 may be directly mounted onto the clasp assembly 108 and/or the cable 106.

The clasp assembly 108 includes a clasp chassis 112 and one or more couplers 114 operatively coupled to the clasp chassis 112. For example, the couplers 114 are one or more of grasping arms, latches, clamps, hooks, jaws, or the like.

In at least one embodiment, the propulsion sub-system 110 includes one or more propellers (for example, fans), engines, and/or or the like. In at least one other embodiment, the propulsion sub-system 110 includes a compressed gas storage vessel (such as a tank, bottle, or the like) and nozzles coupled thereto. Optionally, the propulsion system 110 may include pressurized liquid or rocket thrusters.

In at least one embodiment, the deployable clasping system 100 may also include a guidance device 115, which may be in communication with a guidance control unit 120 that is configured to navigate and/or guide movement of the clasp assembly 108 to the object 104. For example, the guidance device 115 may be or otherwise includes one or more sensors 252, such as alignment sensors and/or proximity sensors, such as a video camera, an ultrasonic imaging device, an infrared imaging device, a laser device, or the like that is configured to receive and/or emit guidance signals in relation to the object 104 in order to guide the clasp assembly 108 to the object 104. Alternatively, the deployable clasping system 100 may not include the guidance device 115.

In at least one embodiment, a signal emitter 232 is disposed on the clasp assembly 108. A target structure on the object 104 may include a reflector. The signal emitters 232 emit signals that are reflected off the reflector, and detected by the sensor(s) 252 to locate the target structure 200, thereby allowing the clasp assembly 108 to align with an close in on the target structure.

In at least one embodiment, the deployable clasping system 100 includes a clasp control unit 118 in communication with the propulsion sub-system 110 and the clasp assembly 108, such as through one or more wired or wireless connections. For example, the clasp control unit 118 may be onboard the transit vehicle 102 and in communication with the propulsion sub-system 110 and the clasp assembly 108 through electrical wires that extend through the cable 106 or via wireless connections. In at least one other embodiment, the clasp control unit 118 is positioned on or within the propulsion sub-system 110 or the clasp assembly 108. In at least one other embodiment, the clasp control unit 118 is remotely located from the transit vehicle 102, the cable 106, the propulsion sub-system 110, and the clasp assembly 108.

In at least one embodiment, the deployable clasping system 100 may also include a guidance control unit 120 in communication with the guidance device 115. The guidance control unit 120 may be part of the clasp control unit 116. Alternatively, the guidance control unit 120 may be separate and distinct from the clasp control unit 116. The guidance control unit 120 receives guidance signals output by the guidance device 115 to guide movement of the clasp assembly 108, via the propulsion sub-system 110, to the object 104. In at least one embodiment, the guidance control unit 120 is housed within the guidance device 115. In at least one other embodiment, the guidance control unit 120 is mounted to or within the transit vehicle 102. In at least one embodiment, the guidance control unit 120 is part of the clasp control unit 118. For example, the clasp control unit 118 and the guidance control unit 120 may form a unitary control unit.

In operation, the transit vehicle 102 is maneuvered towards the object 104. The cable 106 is deployed from the transit vehicle 102. For example, the cable 106 may be unspooled, dropped, or otherwise deployed from a portion of the transit vehicle 102. The guidance device 115 (which includes the sensors 252 and the signal emitters 232) emits and/or receives guidance signals in relation to the object 104. For example, the guidance device 115 may emit, receive, and/or acquire images, laser beams, ultrasonic signals, infrared signals, and/or the like in relation to the object 104. The guidance control unit 120 receives the guidance signals, which are output by the guidance device 115. The guidance control unit 120 analyzes the guidance signals to determine a location of the object 104. The clasp control unit 118 cooperates with the guidance control unit 120 to operate the propulsion sub-system 110 to maneuver the clasp assembly 108 and/or the cable 106 so that the clasp assembly 108 is proximate and/or contacting the object 104. For example, the propulsion sub-system 110 and the clasp assembly 108 receive control signals output by the clasp control unit 118 that control operation of the propulsion sub-system 110 and the clasp assembly 108.

When the clasp assembly 108 is proximate to (such as on or within a predetermined distance, such as 1 foot) the object 104, the clasp control unit 118 operates the clasp assembly 108 so that the coupler(s) 114 securely couple to (for example, grasp) the object 104. After the coupler(s) 114 securely couple to the object 104, the object 104 may be lifted and removed, such as via the transit vehicle 102 retracting the cable 106 and/or otherwise moving the object 104. In this manner, the deployable clasping system 100 may automatically locate the object, such as via the guidance device 115 and the guidance control unit 120, guide the clasp assembly 108 onto the object via the propulsion sub-system 110 as controlled by the clasp control unit 116, and securely clasp the object 104 via the clasp assembly 108 without human intervention.

In at least one embodiment, the deployable securing system 100 does not include the guidance device 115 and the guidance control unit 120. Instead, an optional control interface 122 may be used by an operator to maneuver the clasp assembly 108 onto the object 104, via the propulsion sub-system 110 and the cable 106 (operation of which is controlled by the clasp control unit 116). The control interface 122 may include one or more engagement devices, such as buttons, switches, joysticks, a touchscreen interface, knobs, wheels, and/or the like that allow an individual to maneuver the clasp assembly 108 onto the object 104 and securely clasp the object 104 via the coupler(s) 114.

In at least one embodiment, the transit vehicle controller 103 communicates with the clasp control unit 116 that the transit vehicle 102 is in the vicinity of the object 104. The clasp control unit 116 then communicates with signal emitters 232 to send impulses toward the object 104. The proximity and alignment sensors 252 receive returning impulses, and communicate these signals to the clasp control unit 116. The clasp control unit 116 then processes the returned impulse signals to determine a distance and direction in relation to the clasp assembly 108 and the object 104.

In at least one embodiment, the clasp control unit 116 operates the winch 105 and the propulsion sub-system 110 to maneuver the clasp assembly 108 to the object 104. Such steps are repeated until the clasp control unit 116 receives signals from the proximity and alignment sensors 252 that that a magnetic portion of the coupler(s) 114 has engaged the object 104. The clasp control unit 116 then communicates with the couplers 114 to clasp the object. The clasp control unit 116 communicates with the transit vehicle controller 103 that the clasp assembly 108 has clasped the object 104.

Figure 2:
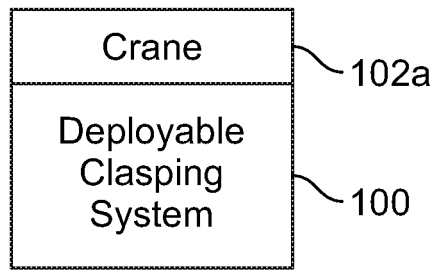
FIG. 2 illustrates a schematic block diagram of the deployable clasping system of a crane, according to an embodiment of the present disclosure.

FIG. 2 illustrates a schematic block diagram of the deployable clasping system 100 of a crane 102a, according to an embodiment of the present disclosure. That is, the crane 102a includes the deployable clasping system 100. The crane 102a is an example of the transit vehicle 102, shown in FIG. 1. The deployable clasping system 100 may be secured to a boom of the crane 102a, for example.

Figure 3:
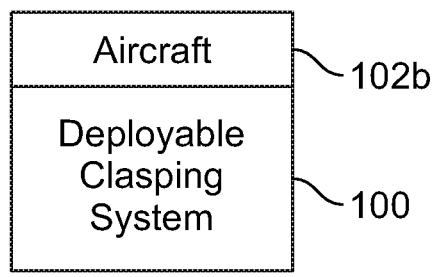
FIG. 3 illustrates a schematic block diagram of the deployable clasping system of an aircraft, according to an embodiment of the present disclosure.

FIG. 3 illustrates a schematic block diagram of the deployable clasping system 100 of an aircraft 102b, according to an embodiment of the present disclosure. That is, the aircraft 102b includes the deployable clasping system 100. The aircraft 102b is an example of the transit vehicle 102, shown in FIG. 1. The aircraft 102b may be a manned aircraft, such as a helicopter or airplane, or an unmanned aircraft, such as a UAV. The deployable clasping system 100 may be secured to a portion of the aircraft 102b.

Figure 4:
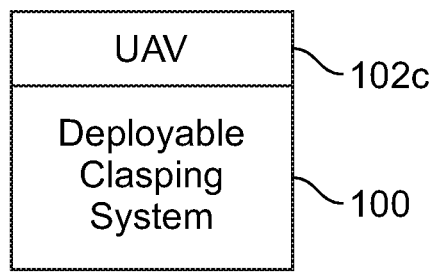
FIG. 4 illustrates a schematic block diagram of the deployable clasping system of an unmanned aerial vehicle (UAV), according to an embodiment of the present disclosure.

FIG. 4 illustrates a schematic block diagram of the deployable clasping system 100 of a UAV 102c, according to an embodiment of the present disclosure. The UAV 102c is an example of the aircraft 102b, shown in FIG. 2.

Referring again to FIG. 1, as used herein, the term "control unit," "controller," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the clasp control unit 118 and the guidance control unit 120 may be or include one or more processors that are configured to control operation thereof, as described herein.

The clasp control unit 118 and the guidance control unit 120 are configured to execute a set of instructions that are stored in one or more data storage units or elements (such as one or more memories), in order to process data. For example, the clasp control unit 118 and the guidance control unit 120 may include or be coupled to one or more memories. The data storage units may also store data or other information as desired or needed. The data storage units may be in the form of an information source or a physical memory element within a processing machine.

The set of instructions may include various commands that instruct the clasp control unit 118 and the guidance control unit 120 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the clasp control unit 118 and the guidance control unit 120. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the clasp control unit 118 and the guidance control unit 120 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
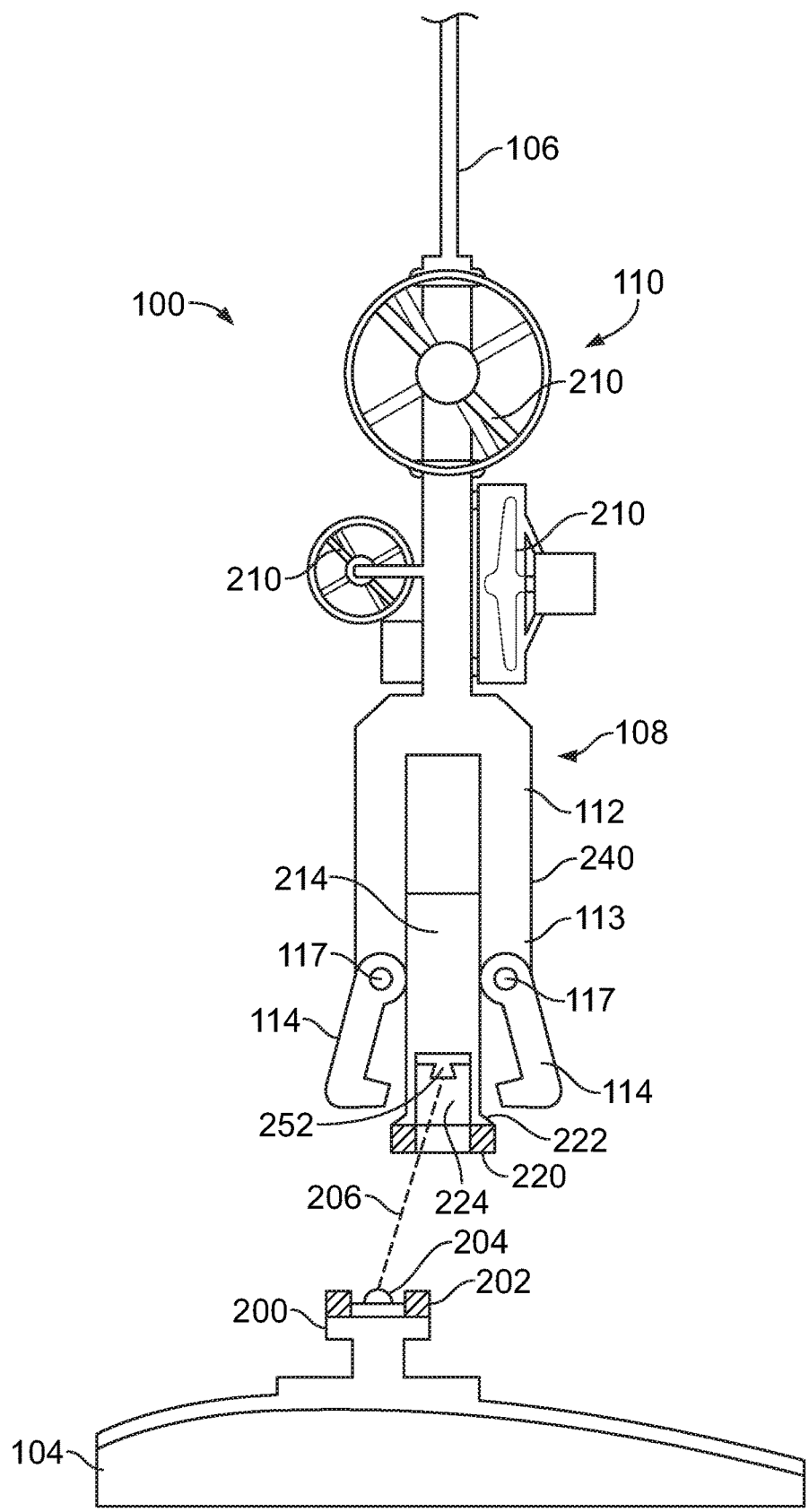
FIG. 5 illustrates a front view of the deployable clasping system positioned over an object, according to an embodiment of the present disclosure.

FIG. 5 illustrates a front view of the deployable clasping system 100 positioned over an object 104, according to an embodiment of the present disclosure. The object 104 may be an individual wearing a vest, jacket, harness, buckle, or the like having a target structure 200, such as a ring. The target structure 200 includes a magnetic portion 202. A guidance signal emitter 204 may be secured to the target structure 200 and configured to emit a guidance signal 206. For example, the guidance signal emitter 204 may be configured to emit the guidance signal 206 as a laser, an infrared beam, an ultrasonic signal, or the like. In at least one embodiment, the guidance signal emitter 204 may optionally or additionally be or include a guidance signal reflector.

In at least one embodiment, the propulsion sub-system 110 includes a plurality of propellers 210 (for example, fans) that are configured to be operated to move the deployable clasping system 100 in various directions. In at least one embodiment, the propellers 210 may be fixed in position. The plurality of propellers 210 fixed in different directions provide selective motion in the various different directions. In at least one other embodiment, the plurality of propellers 210 may be configured to rotate about different axes, such as via gimbals, to provide motion in different directions. In at least one embodiment, the propulsion sub-system 100 includes a single propeller 210 that is configured to rotate about different axes.

The clasp assembly 108 includes the clasp chassis 112 having opposed couplers 114, such as pivotal hooks, moveably mounted to a distal end 113 of the clasp chassis 112. The opposed couplers 114 are configured to open away from each other and close towards each other via pivot axles 117. In this manner, the couplers 114 are configured to open away from each other to secure over and around the target structure 200, and securely close onto and grasp the target structure 200. In at least one embodiment, the latches 114 may be coupled to the clasp chassis 112 via one or more hinges and either a solenoid or a helical spring.

In at least one embodiment, the guidance device 115 includes one or more sensors 252 mounted to a clasp core 214 extending from the clasp chassis 112 between the couplers 114. A magnetic hitch 220 is positioned on a distal end 222 of the clasp core 214. The sensors 252 are secured within an open cavity 224 of the magnetic hitch 220.

Referring to FIGS. 1 and 5, in operation, the sensor(s) 252 receives the guidance signal 206 output by the guidance signal emitter 204. In at least one embodiment, the sensor(s) 252 (such as proximity and alignment sensors) emit the guidance signal 206, which reflects off a portion of the target structure 200 (instead of the target structure 200 including a separate guidance signal emitter 204). In at least one embodiment, the sensor(s) 252 may detect a portion of the target structure 200 through image recognition, such as a discernable identifying feature of the target structure 200.

The sensor(s) 252 may output a guidance signal, which is received by the guidance control unit 120 (which, again, may be part of the clasp control unit 116). The clasp control unit 116 then operates the propulsion sub-system 110 (for example, the propeller(s) 210) and/or the winch 105 to maneuver the clasp assembly 108 towards and onto the target structure 200.

Figure 6:
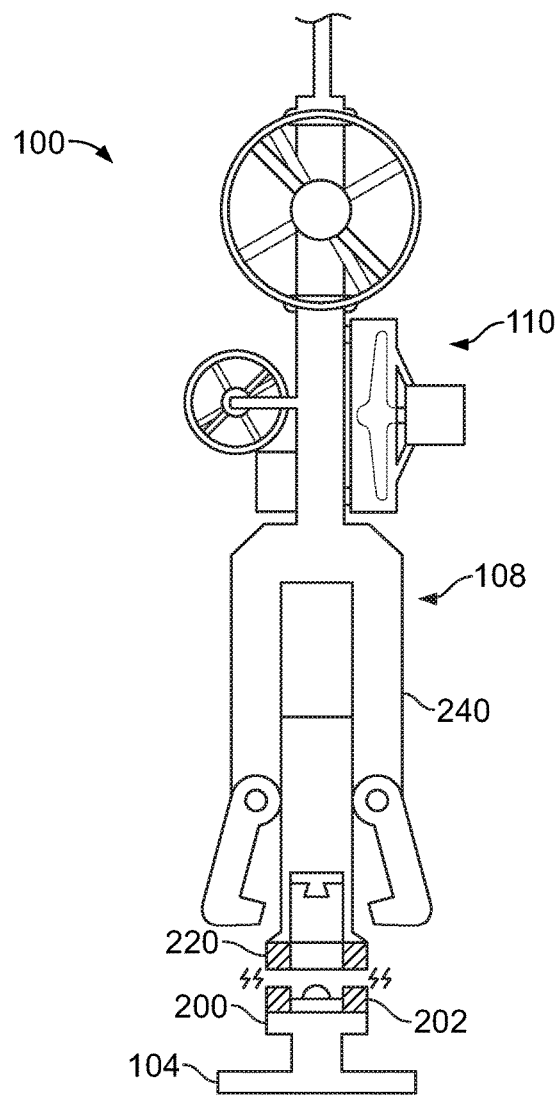
FIG. 6 illustrates a front view of the deployable clasping system aligned in relation to a target structure of the object.

FIG. 6 illustrates a front view of the deployable clasping system 100 aligned in relation to the target structure 200 of the object 104. Referring to FIGS. 1, 5, and 6, the clasp control unit 116 cooperates with the guidance control unit 120 (or uses the guidance control unit 120, as part of the clasp control unit 116) to maneuver the clasp assembly 108 into alignment with the target structure 200. When the magnetic hitch 220 is proximate to the magnetic portion 202 of the target structure 200, the magnetic hitch 220 and the magnetic portion 202 magnetically couple to one another, thereby providing a magnetic connection between the clasp assembly 108 and the target structure 200.

Figure 7:
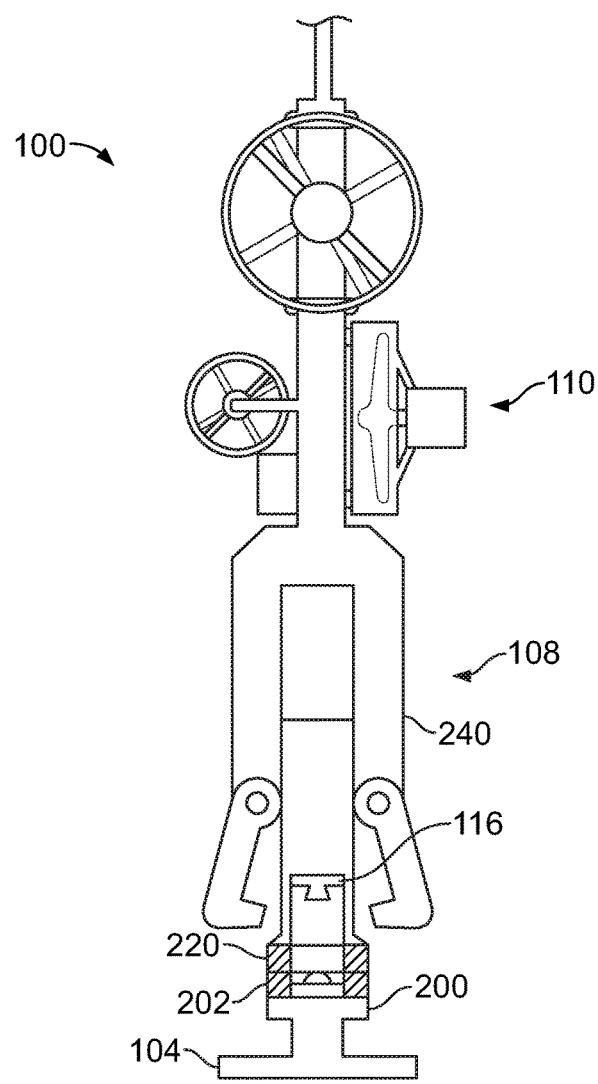
FIG. 7 illustrates a front view of the deployable clasping system magnetically coupled to the target structure of the object.

FIG. 7 illustrates a front view of the deployable clasping system 100 magnetically coupled to the target structure 200 of the object 104. Referring to FIGS. 1 and 7, in response to the magnetic hitch 220 magnetically coupling to the magnetic portion 202, the guidance device 115 may output a magnetic coupling signal (such as via the sensors 252) to the guidance control unit 120. In response, the guidance control unit 120 may then operate the clasp assembly 108 to securely clasp the target structure 200 of the object 104.

FIG. 8 illustrates a front view of the deployable clasping system 100 moving onto the target structure 200 of the object 104. In at least one embodiment, the clasp assembly 108 includes a lock ring 240 around a portion of the clasp chassis 112. The lock ring 240 may be servo controlled, so that the clasp core 214 may be retracted into a central channel 119 of the clasp chassis 112. Referring to FIGS. 1 and 8, after the guidance control unit 120 receives the magnetic coupling signal, the clasp control unit 116 operates the clasp assembly 108 to retract the clasp core 214 into the central channel 119 so that the couplers 114 slide over lateral portions of the target structure 200.

FIG. 9 illustrates a front view of the deployable clasping system 100 securely clasping the target structure 200 of the object 104. Referring to FIGS. 1, 8, and 9, the clasp control unit 116 continues to operate the couplers 114 so that the distal hooks 121 of the couplers 114 pivotally latch underneath ledges 215 of the target structure 200 (and/or into channels of the target structure 200), thereby securely clasping onto the target structure 200. The clasp control unit 116 receives a grasping signal from the couplers 114 indicating a secure clasping, such as when the couplers 114 are in a defined clasping position, and/or via a signal received from an interface between the hooks 121 and the ledges 215 and/or channels of the target structure 200.

When the clasp assembly 108 is securely coupled to the target structure 200, as shown in FIG. 9, the deployable clasping system 100 may be used to lift and extract the object 104. For example, a crane, aircraft, or the like that includes the deployable clasping system 100 may then be operated to lift the object 104. In at least one embodiment, the couplers 114 securely clasp onto the target structure 200, as shown and described with respect to FIGS. 5-9. In at least one other embodiment, the couplers 114 may securely clasp onto other portions of the object 104, such as integral features of the object. In at least one other embodiment, the couplers 114 may securely clasp onto the object 104 by scooping up the object, or otherwise trapping one or more portions of the object between the couplers 114. In at least one other embodiment, the couplers 114 may securely clasp onto the object 104 by hooking onto a loop of tether, rope, net, or the like affixed to the object 104.

Figure 10:
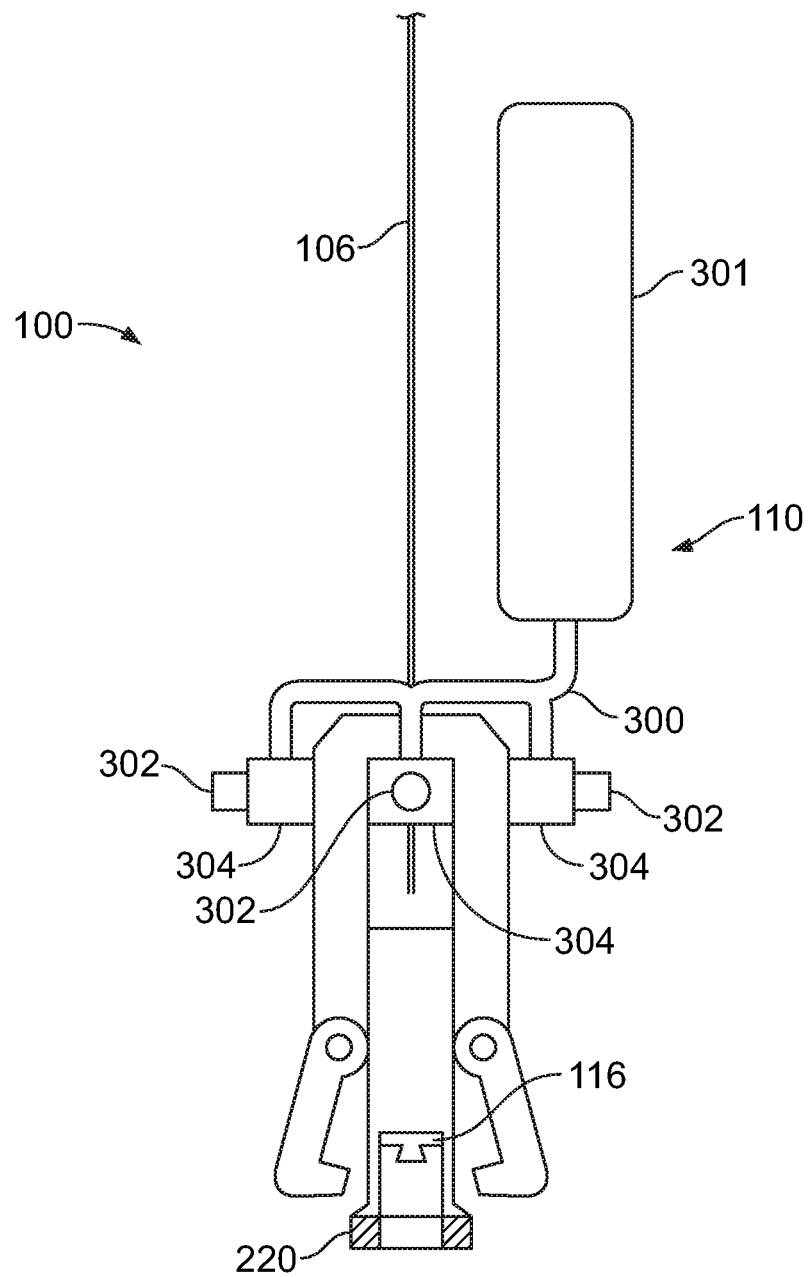
FIG. 10 illustrates a front view of the deployable clasping system, according to an embodiment of the present disclosure.

FIG. 10 illustrates a front view of the deployable clasping system 100, according to an embodiment of the present disclosure. In this embodiment, instead of the propulsion sub-system 110 including propellers, the propulsion sub-system 110 includes a vessel 301 containing compressed gas (such as air). The vessel 301 is in fluid communication with a manifold 300 having nozzles 302 coupled to valves 304. Referring to FIGS. 1 and 10, the clasp control unit 118 operates the propulsion sub-system 110 by selectively opening and closing the valves 304 to allow compressed gas to selectively pass out of the nozzles 302, thereby providing thrust in desired directions.

Figure 11:
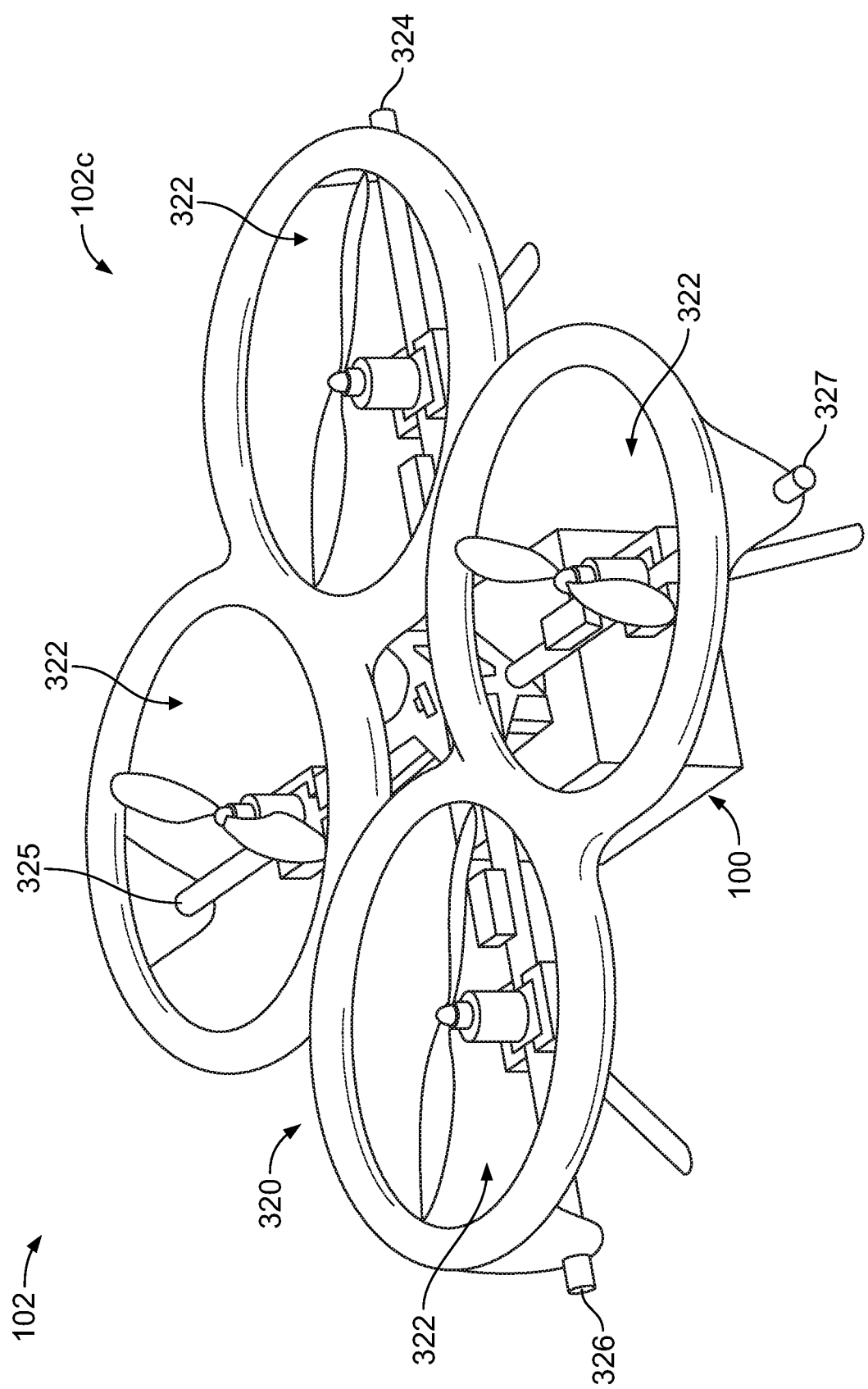
FIG. 11 illustrates a top view of a UAV, according to an exemplary embodiment of the present disclosure.

In at least one embodiment, the propulsion sub-system 110 includes the propeller(s) 210, as shown and described with respect to FIGS. 5-9, and the vessel 310, the manifold 300, the nozzles 302, and the valves 304 shown and described with respect to FIG. 10. In at least one other embodiment, the propulsion sub-system 110 includes a vessel of compressed gas, pressurized liquid, or rocket thrusters FIG. 11 illustrates a top view of a UAV 102c, according to an exemplary embodiment of the present disclosure. The UAV 102c is an example of the UAV 102c shown in FIG. 4, and is an example of a transit vehicle that includes the deployable clasping system 100, shown in FIGS. 1 and 5-10, for example. The UAV 102c includes an airframe 320 and a plurality of propelling systems 322 (which are separate and distinct from the propulsion sub-system 110 of the deployable clasping system 100) coupled to the airframe 320. In general, the airframe 320 forms the structural body or framework for the UAV 102c. In the illustrated embodiment shown in FIG. 11, the UAV 102c includes four propelling systems 322, such that each propulsion sub-system 322 is mounted to a respective arm 324, 325, 326, and 327. In the illustrated embodiment, the UAV 102c includes four arms 324-327 and a single propulsion sub-system 322 that is mounted to each respective arm 324-327. Optionally, the UAV 102c may include more or less propelling system 322, more or less propelling systems 322 per arm 324-327, and more or less arms 324-327 than shown.

Referring to FIGS. 1 and 4-11, the deployable clasping system 100 is secured to a portion of the airframe 320. For example, the deployable clasping system 100 is secured to a central portion of the airframe 320. A vehicle may include the deployable clasping system 100. The winch 105 and the propulsion sub-system 110 are operated to guide the clasp assembly 108 to the target structure 200 of the object 104, for example.

The UAV 102c shown in FIG. 11 is merely one example of a UAV. The UAV 102c may optionally be a fixed wing plane with various other types of propulsion sub-systems. For example, the UAV 102c may be an unmanned plane having one or more propellers, jet engines, and/or the like.

Figure 12:
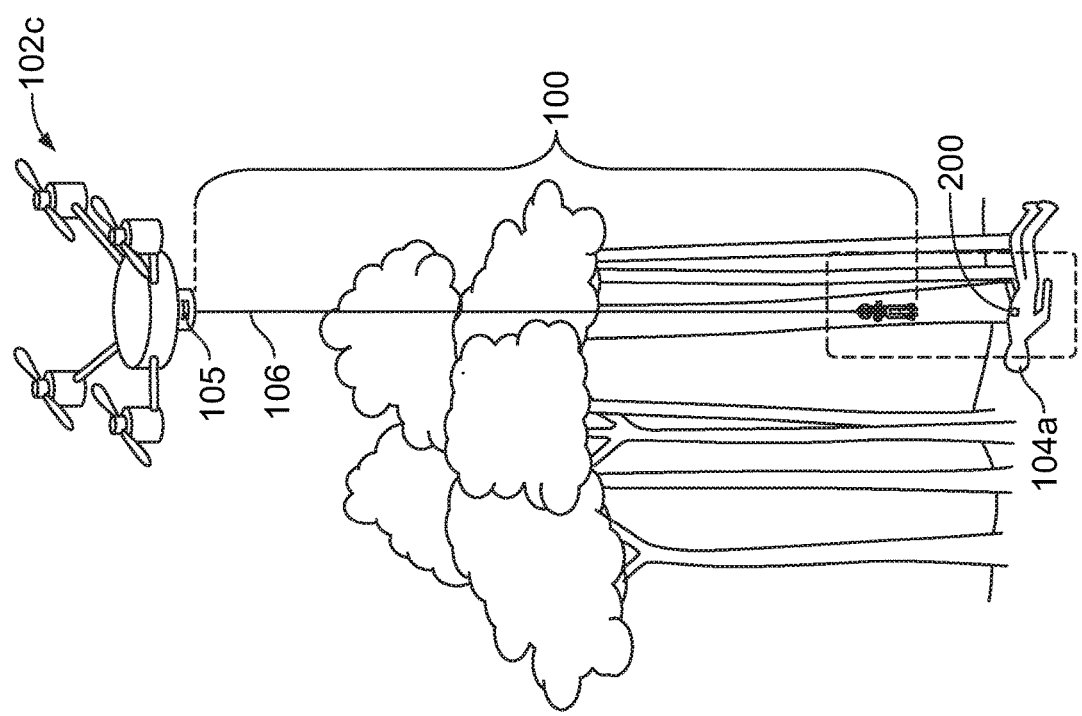
FIG. 12 illustrates a front view of a UAV having the deployable clasping system being maneuvered towards an individual, according to an embodiment of the present disclosure.

FIG. 12 illustrates a front view of a UAV 102c having the deployable clasping system 100 being maneuvered toward an individual 104a, according to an embodiment of the present disclosure. The UAV may be maneuvered to the location of the individual, such as via global positioning system (GPS) signals output by a GPS device carried by the individual 104a. In at least one embodiment, the deployable clasping system 100 includes a control unit (for example, the clasp control unit 118, the guidance control unit 120, and/or another control unit) that is configured to detect a range to individual 104a (or another object) to determine a distance to travel before the clasp assembly 108 is able to couple to the individual 104a, such as via a target structure 200. The deployable clasping system 100 may be deployed from the UAV 102c, and securely clasp onto a portion of the individual 104a, such as the target structure 200 of a harness worn by the individual 104a, as described herein.

Figure 13:
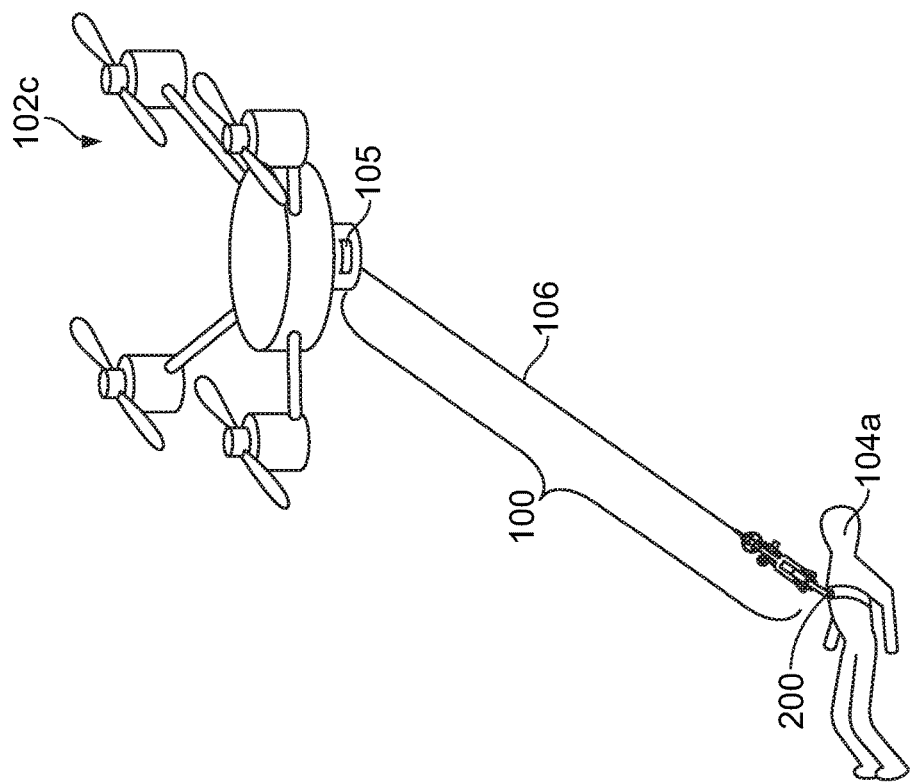
FIG. 13 illustrates a front view of the UAV moving the individual to another location, according to an embodiment of the present disclosure.

FIG. 13 illustrates a front view of the UAV 102c moving the individual 104a to another location, according to an embodiment of the present disclosure. Once the individual 104a is secured to the deployable clasping system 100, the UAV may then fly the individual 104a to a safe location.

Figure 14:
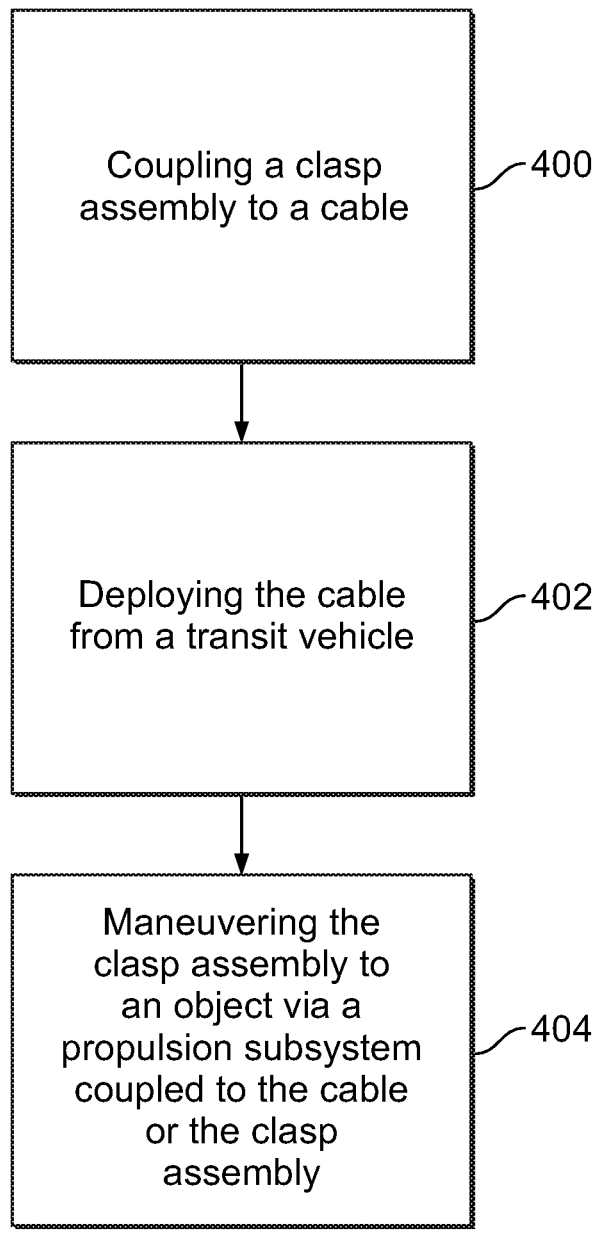
FIG. 14 illustrates a flow chart of a deployable clasping method that is configured to securely clasp and release an object, according to an embodiment of the present disclosure.

FIG. 14 illustrates a flow chart of a deployable clasping method that is configured to securely clasp and release an object, according to an embodiment of the present disclosure. In at least one embodiment, the transit vehicle controller 103 (shown in FIG. 1) of the transit vehicle 102 controls movement of the transit vehicle 102 into the vicinity of the object. Next, the transit vehicle controller(s) 103 operates the winch 105 (shown in FIG. 1) vertically, and the propulsion sub-system 110 horizontally maneuvers the clasp assembly 108 into contact with the object, such as with respect to the target structure 200 (shown in FIGS. 1 and 5, for example) on the object. The deployable clasping method may include coupling (400) a clasp assembly that is configured to securely clasp the object to a cable, deploying (402) the cable from a transit vehicle (such as via a winch or another deployment device), and maneuvering (404) the clasp assembly to the object by a propulsion sub-system that is coupled to one or both of the cable or the clasp assembly. The method may also include coupling the clasp assembly to the object via operation of the couplers, such as latches.

The coupling the clasp assembly may include operatively coupling one or more couplers to a clasp chassis. The maneuvering (404) may include maneuvering the clasp assembly to the object by one or more propellers.

The deployable clasping method may also include guiding movement of the clasp assembly to the object by a guidance device. The deployable clasping method may also include magnetically coupling the clasp assembly to a target structure coupled to the object. The deployable clasping method may also include securely latching onto the target structure after the magnetically coupling. In at least one embodiment, the deployable clasping method includes controlling the clasp assembly and the propulsion sub-system by a clasp control unit.

Referring to FIGS. 1-14, embodiments of the present disclosure provide efficient, reliable, and automatically-operated grasping systems and methods. Further, embodiments of the present disclosure provide grasping systems and methods that allow an object to be safely recovered.

As described herein, the deployable clasping systems and methods may be used in relation to extraction and recovery of individuals from hostile territory, insertion of tactical operators (such as special forces) into locations, transportation of military prisoners to secure holding facilities without manned escort, insertion and extraction of emergency personnel (such as forest fire combating personal), civilian search and recovery victim evacuations, crane operations, and/or the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A deployable clasping system that is configured to be deployed from a component and securely clasp and release an object, the deployable clasping system comprising:
   a cable that is deployable from the component;
   a clasp assembly coupled to the cable, wherein the clasp assembly is configured to securely clasp the object; and
   a propulsion sub-system directly mounted on to one or both of the cable or the clasp assembly, wherein the propulsion sub-system is configured to maneuver the clasp assembly to the object.

2. The deployable clasping system of claim 1, wherein the clasp assembly comprises one or more couplers operatively coupled to a clasp chassis.

3. The deployable clasping system of claim 1, wherein the propulsion system comprises one or more propellers.

4. The deployable clasping system of claim 1, wherein the propulsion sub-system comprises a vessel of compressed gas, pressurized liquid, or rocket thrusters.

5. The deployable clasping system of claim 1, further comprising a guidance device that is configured to guide movement of the clasp assembly to the object.

6. The deployable clasping system of claim 5, wherein the guidance device comprises one or more sensors mounted to a clasp core, wherein a magnetic hitch is disposed on a distal end of the clasp core.

7. The deployable clasping system of claim 6, wherein the magnetic hitch is configured to magnetically couple to a magnetic portion of a target structure coupled to the object.

8. The deployable clasping system of claim 7, wherein one or more couplers securely latch onto the target structure after the magnetic hitch magnetically couples to the magnetic portion of the target structure.

9. The deployable clasping system of claim 5, further comprising a guidance control unit in communication with the guidance device, wherein the guidance control unit receives guidance signals output by the guidance device to guide movement of the clasp assembly to the object.

10. The deployable clasping system of claim 1, further comprising a clasp control unit in communication with the propulsion sub-system and the clasp assembly, wherein the clasp control unit controls operation of the propulsion sub-system and the clasp assembly.

11. The deployable clasping system of claim 1, wherein the component is a crane.

12. The deployable clasping system of claim 1, wherein the component is an aircraft.

13. The deployable clasping system of claim 12, wherein the aircraft is an unmanned aerial vehicle (UAV).

14. The deployable clasping system of claim 1, wherein the propulsion sub-system is separate and distinct from one or more other propulsions sub-systems of the component.

15. A deployable clasping method that is configured to securely clasp and release an object, the deployable clasping method comprising:
coupling a clasp assembly that is configured to securely clasp the object to a cable;
deploying the cable from a component; and
maneuvering the clasp assembly to the object by a propulsion sub-system that is directly mounted on to one or both of the cable or the clasp assembly.

16. The deployable clasping method of claim 15, wherein the coupling the clasp assembly comprises operatively coupling one or more couplers to a clasp chassis.

17. The deployable clasping method of claim 15, wherein the maneuvering comprises maneuvering the clasp assembly to the object by one or more propellers.

18. The deployable clasping method of claim 15, further comprising guiding movement of the clasp assembly to the object by a guidance device.

19. The deployable clasping method of claim 15, further comprising:
magnetically coupling the clasp assembly to a target structure coupled to the object; and
securely latching onto the target structure after the magnetically coupling.

20. The deployable clasping method of claim 16, controlling the clasp assembly and the propulsion sub-system by a clasp control unit.

21. An unmanned aerial vehicle (UAV) comprising:
an airframe; and
a deployable clasping system secured to the airframe, wherein the deployable clasping system is configured to be deployed from the airframe and securely clasp and release an object, the deployable clasping system comprising:
a cable that is deployable from the airframe;
a clasp assembly coupled to the cable, wherein the clasp assembly is configured to securely clasp the object, wherein the clasp assembly comprises one or more couplers operatively coupled to a clasp chassis;
a propulsion sub-system directly mounted on one or both of the cable or the clasp assembly, wherein the propulsion sub-system is configured to maneuver the clasp assembly to the object;
a guidance device that is configured to guide movement of the clasp assembly to the object;
a guidance control unit in communication with the guidance device, wherein the guidance control unit receives guidance signals output by the guidance device to guide movement of the clasp assembly to the object; and
a clasp control unit in communication with the propulsion sub-system and the clasp assembly, wherein the clasp control unit controls operation of the propulsion sub-system and the clasp assembly.

* * * * *